US005118240A

United States Patent [19]

Kyoo

[11] Patent Number: 5,118,240

[45] Date of Patent: Jun. 2, 1992

[54] LITHOGRAPHIC PLATE STORING SYSTEM

[75] Inventor: Takatsugu Kyoo, Iruma, Japan

[73] Assignee: Tsu Bakimoto Chain Co., Japan

[21] Appl. No.: 555,265

[22] Filed: Jul. 19, 1990

[30] Foreign Application Priority Data

Jul. 27, 1989 [JP] Japan .............................. 1-87443[U]

[51] Int. Cl.[5] ................................................ B65G 1/06

[52] U.S. Cl. ................................ 414/269; 198/468.8; 414/273; 414/280; 414/609

[58] Field of Search ............... 414/280, 273, 277, 661, 414/268, 269, 609; 198/468.8

[56] References Cited

U.S. PATENT DOCUMENTS 3,715,040 2/1973 Polus et al. ..................... 414/280 X
4,470,741 9/1984 Bossler et al. ....................... 414/280
4,866,661 9/1989 de Prins .......................... 414/273 X
4,932,827 6/1990 Schlunke et al. ................... 414/280

FOREIGN PATENT DOCUMENTS 189901 11/1982 Japan .................................. 414/273

*Primary Examiner*—David A. Bucci

[57] ABSTRACT

A lithographic plate storing system comprises a lifting member for engaging with a hook of a lithographic plate; a carriage including a lithographic plate engagement member which is adapted to be located in an advanced position while the lifting member is lowered so as to receive the lithographic plate and in a retreated position while the lifting member is raised so as not to interfere therewith and a pusher for sidewardly pushing the lithographic plate while the lithographic plate is supported by the engagement member; and a fixed storage shelf including a plurality of perpendicularly spaced-apart partitions.

4 Claims, 7 Drawing Sheets

LITHOGRAPHIC PLATE STORING SYSTEM

FIELD OF INVENTION

The present invention relates to a storing system of lithographic plates which are used for printing newspapers and the like so that they may be taken out so as to be mounted to a rotary press.

PRIOR ART

Lithographic plates are usually conveyed by means of a hanger conveyor in a suspended manner. Before they are mounted to a rotary press, they are temporarily stored in a shelf. The stored lithographic plates are required to be selectively taken out from the storage shelf so that they may be mounted to a designated rotary press. Such a storage shelf is disclosed in, for example, in U.S. Pat. No. 4,903,817 according to which the lithographic plates must be taken out on the basis of "first-in, first-out". In other words, lithographic plates cannot be taken out from the storage shelf at random or selectively.

That is, as shown in FIG. 7, a lithographic plate P which has been transported by a hanger conveyor H is first disengaged from the conveyor H and slides along a guiding chute G so as to be received by a pair of supporting sections. The lithographic plate P is then dropped to a lateral feed conveyor C which in turn feeds the lithographic plate P into a shelf comprising a plurality of endlessly revolving trays T.

The shelf S is so constructed that each time a lithographic plate P is received by a tray T from the lateral feed conveyor C, the tray T descends by the mounting pitch of the trays; and the next empty tray T is adapted to receive the next lithographic plate P.

Thus, a number of lithographic plates may be stored on the trays in the descending path. At the lowermost position. the lithographic plate P may be taken out from an exit D. The emptied trays are then sent upward in the ascending path.

Accordingly, the lithographic plates P may be stored in the descending path of the trays between the feeding end of the lateral feed conveyor C and the exit.

PROBLEMS TO BE SOLVED BY THE INVENTION

In case of the above-mentioned prior art, since the entrance of the lithographic plates is located above the exit, the storage shelf S must be operated on the "first-in, first-out" principle.

However, since the necessity to forward a particular lithographic plate to a particular printing press arises, as a matter of fact, at random. Therefore, a storage shelf which must be operated on the "first-in, first-out" basis is inconvenient.

In fact, in FIG. 7, even if the lithographic plate which arrives at the exit D is not required for the time being, it must in any event be taken out from the exit D, because it falls from the tray T as the tray turns and enters the ascending path.

Consequently, such lithographic plates are temporarily stored somewhere near the exit D. However, as the number of such temporarily held lithographic plates increases, it becomes difficult to find out the necessary lithographic plate from a number of the stored plates, which will undoubtedly adversely affect the mounting operation of the necessary lithographic plates to a rotary press.

SUMMARY OF INVENTION

In view of the above-mentioned problems of the prior art, there is provided a lithographic plate storing system comprising a lifting member for engaging with a hook of a lithographic plate, a carriage means including a lithographic plate engagement member which is adapted to be located in an advanced position while said lifting member is lowered so as to receive said lithographic plate and in a retreated position while said lifting member is raised so as not to interfere therewith and a pusher for sidewardly pushing said lithographic plate while said lithographic plate is supported by said engagement member, and a fixed storage shelf comprising a plurality of perpendicularly spaced-apart partitions.

FUNCTION

The lifting member engages with the hook of a lithographic plate which lies on a lateral feed conveyor horizontally; and raises the lithographic plate into a suspended form. The lithographic plate is then received by an engagement member carried by a carriage means which is adapted to run along the opening side of the fixed storage shelf. The pusher provided to the carriage means pushes the lithographic plate suspended by said engagement member sidewardly so as to insert the lithographic plate into a space defined by adjacent partitions of said fixed storage shelf.

Thus. the lithographic plates held between the adjacent partitions may be taken out at random and selectively without regard to the order of their storage into the shelf.

BRIEF DESCRIPTION OF DRAWINGS

FIGS. 1 to 6 illustrate embodiments of the present invention, in which,

FIG. 1 is a schematic front view;

FIG. 2 is an enlarged side view illustrating how a lithographic plate is transferred at the lower end of the upright shaft;

FIG. 3 is a partial, enlarged front view;

FIG. 4 is a front view of the carriage means;

FIG. 5 is a side view of the carriage means;

FIG. 6 is a side view of FIG. 3; and

EMBODIMENTS

Figure 1:
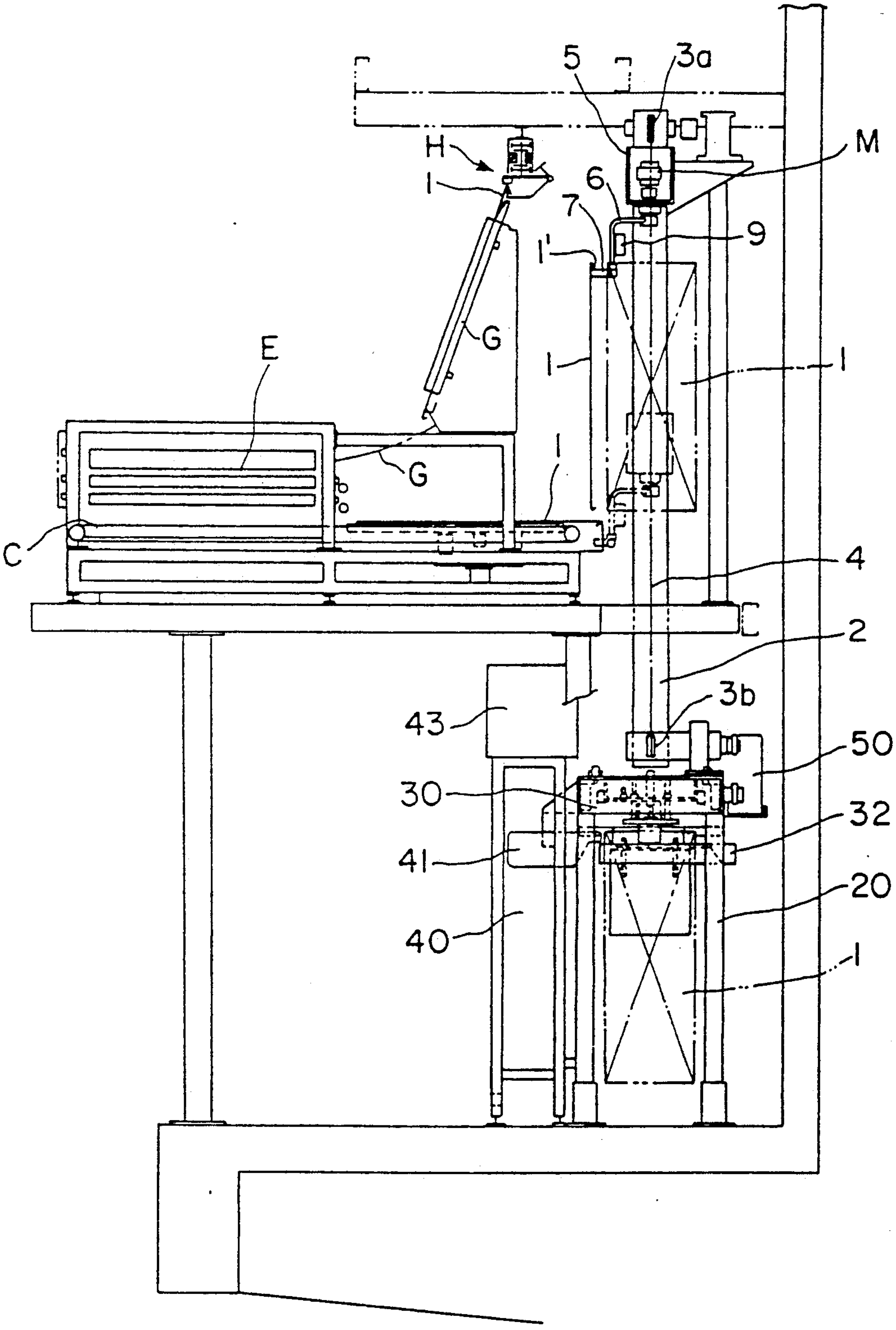

In FIG. 1, a lithographic plate 1 which has been conveyed by a conveyor H in a suspended manner slides down along a chute G so as to be received in a horizontal form by the uppermost shelf of a support means E. The support means E comprises a plurality of shelves each comprising a pair of opposing support members. The support means E is arranged in multiple stages of like structures. The lithographic plate 1 received by the uppermost shelf is dropped to the next stage shelf as the uppermost opposing support members open. By repeating this procedure, the lithographic plate 1 is finally received by an intermittently driven conveyor C so as to be fed forward with a downwardly facing hook 1' placed at the frontmost position.

Near the end of the conveyor C, an upright shaft 2 is erected. A driving sprocket 3*a* and driven sprocket 3*b* are provided at the upper and lower ends of the shaft 2, respectively with a driving chain spanning therebetween. A lithographic plate lifting member 5 is connected to the driving chain 4 having a support member 6 which is pivotably connected to the lithographic plate lifting member 5. To the lower end of the support means 6, a lithographic plate engagement member 7 is secured so as to engage with the hook 1' of the lithographic plate 1. Furthermore, a lithographic plate holding lever 8 is pivotably supported to the support member 6 so that the top of the hook 1' engaging with the engagement member 7 may be securely held. The lever 8 is adapted to be operated to take two positions, open and closed, by a pneumatic cylinder 9 mounted to the support member 6.

The lifting member 5 includes a guiding member 10 slidably engageable with a guide rail 2' formed in the upright shaft 2 and further includes a motor M for driving the shaft 6' of the support member 6, a speed reducer V and a coupling, etc.

As the lithographic plate lifting member 5 ascends, from beneath the plate 1, relative to a lithographic plate 1 which is placed at the take-out end of the conveyor C with a downwardly facing hook 1' protruding from the end of the conveyor C from, the engaging section 7' of the engagement member 7 picks up the hook 1' and thus lifts the lithographic plate 1 upward. Thus, the lithographic plate 1 may be suspended as shown by solid line in FIG. 1.

The thus suspended lithographic plate 1 may be turned by 90 degrees about the shaft 6' to the position as shown in two-dot-dash line in FIG. 1. Then, the suspended lithographic plate 1 may descend without interfering with the take-out end of the conveyor C.

Figure 2:
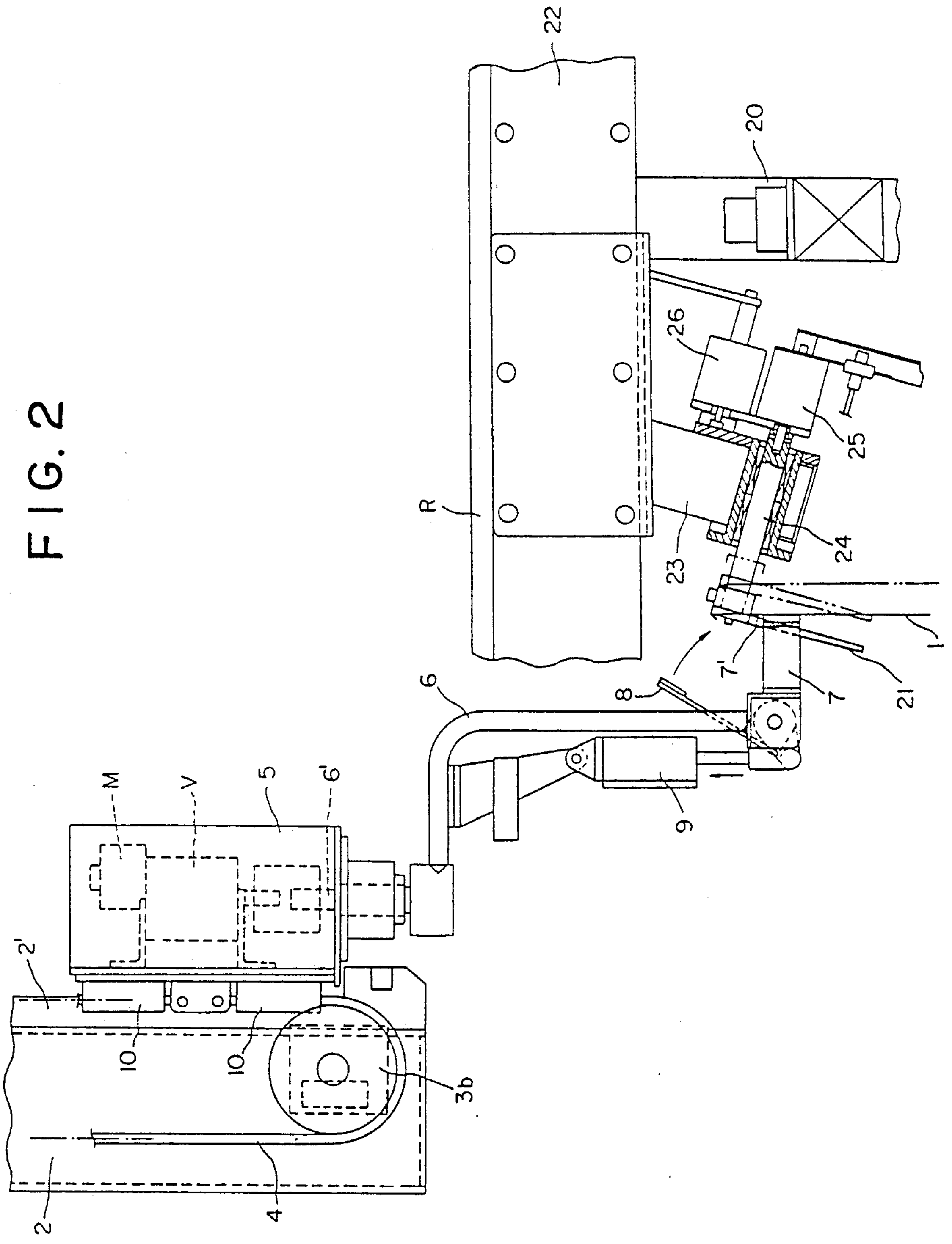
Figure 3:
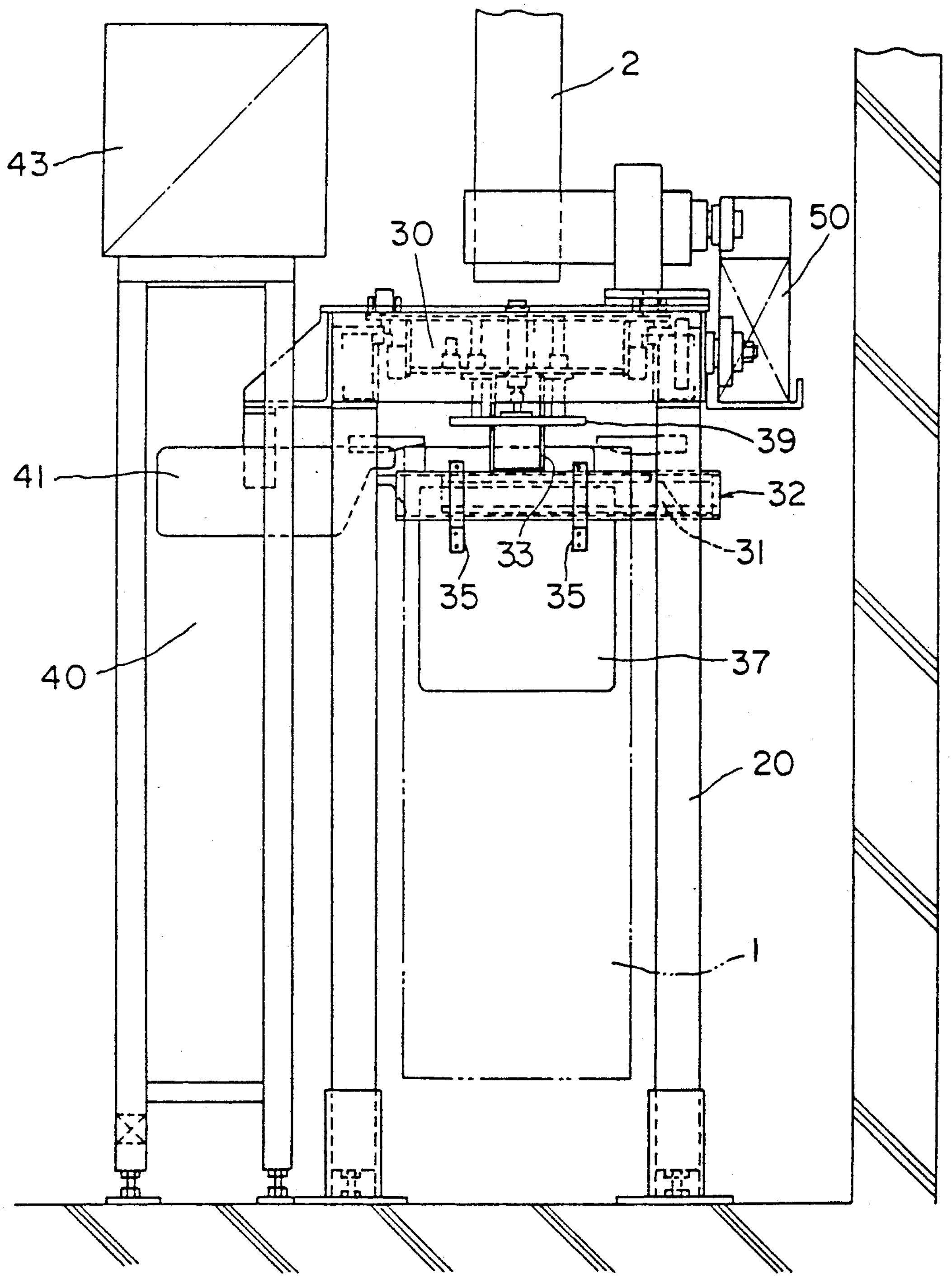

The lifting member 5 engaging with the lithographic plate 1 is then caused to descend by the chain 4 to the lowermost position as shown in FIG. 2.

In FIG. 1, reference numeral 20 denotes a frame supporting a carriage means 30 (described later) for storing lithographic plate(s) 1 into a storage shelf 40 in a suspended manner.

Immediately before the lifting member 5 reaches the lowermost position, a pair of swivelable engaging members 21, 21 are awaiting on the descending path of the engaging section 7' of the engaging member 7 as shown in FIG. 2.

Figure 4:
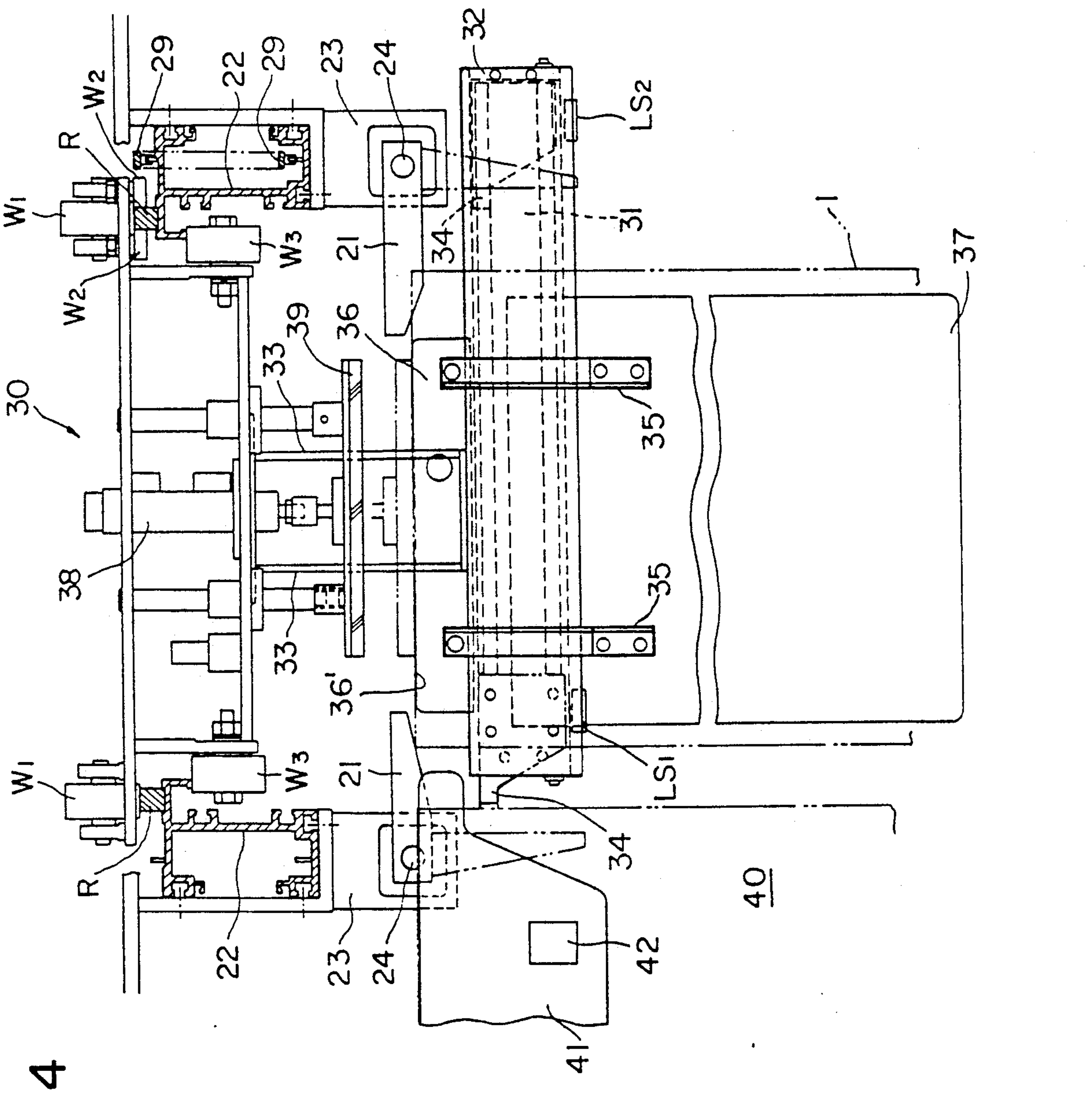

As shown in FIGS. 2 and 4, said swivelable engagement members 21, 21 are supported by the respective shafts 24, 24 mounted to a pair of plates 23, 23 which are respectively secured to beams 22, 22 supported by the frame 20. And, the respective shafts 24, 24 are adapted to be turned 80 degrees so as to face with each other. Thus, the swivelable engaging members 21, 21 may take the two selective positions, namely, the one which is horizontal as shown by solid line in FIG. 4 for engaging with the hook 1' of a lithographic plate 1 and the other position which is vertical as shown by two-dot-dash line in FIG. 4 to allow the lithographic plate 1 to drop therefrom. Moreover, the swivelable engaging members 21, 21 are adapted to advance and retreat as shown by solid line and two-dot-dash line respectively in FIG. 2 by means of a motor 26.

The engaging section 7' of the engagement member 7 is adapted to engage with the intermediate portion of the hook 1' while the swivelable engaging members 21, 21 are adapted to engage with the two end portions of the hook 1'. Thus, as the lithographic plate 1, the intermediate portion of which is engaged with the engaging section 7' of the engagement member 7, comes down, the advanced, horizontally held swivelable engaging members 21, 21 may engage with the two end portions of the hook 1' without interfering with the engaging section 7' of another engagement member 7. As the lifting means 5 further descends to the lowermost position, the engaging section 7' of the engagement member 7 disengages from the hook 1'; and then, the hook 1' are suspended by means, only, of the swivelable engaging members 21, 21.

Thereafter, the swivelable engaging members 21, 21 are caused to retreat by means of the motor 26 to the position as shown by two-dot-dash line in FIG. 2 so as to be outside the moving path of the engaging section 7'; then, the lifting member 5 is capable of ascending without interfering with the swivelable engaging members 21, 21, so that the lifting member 5 may be again raised in order to receive the next lithographic plate, and turned 90 degrees, and then await the next lithographic plate at the take-out end of the conveyor C.

On the upper surface of the beam 22, as shown in FIG. 4, a pair of rails R, R are disposed so as to guide the carriage means 30. The carriage means 30 comprises a pair of running wheels $W_1$, $W_1$, a pair of guide rollers $W_2$, $W_2$, and a pair of floating prevention rollers $W_3$, $W_3$. At both ends of the beam 22, a driving sprocket 27 and a driven sprocket 28 are respectively disposed; and a belt 29 spans therebetween so as to drive the carriage means 30 attached thereto.

At the lower part of the carriage means 30, a fixture 32 including a rod-less cylinder 31 is secured via a yoke 33. The stroke of the piston (not shown) of the rod-less cylinder 31 is substantially equal to the full length thereof and is adapted to actuate to and fro a pusher 34 along a guide (not shown) provided to the fixture 32. The pusher 34 is further adapted to be reversely actuated as it reaches the stroke end limit switch $LS_1$; and stops as it reaches the retreat end limit switch $LS_2$.

Figure 5:
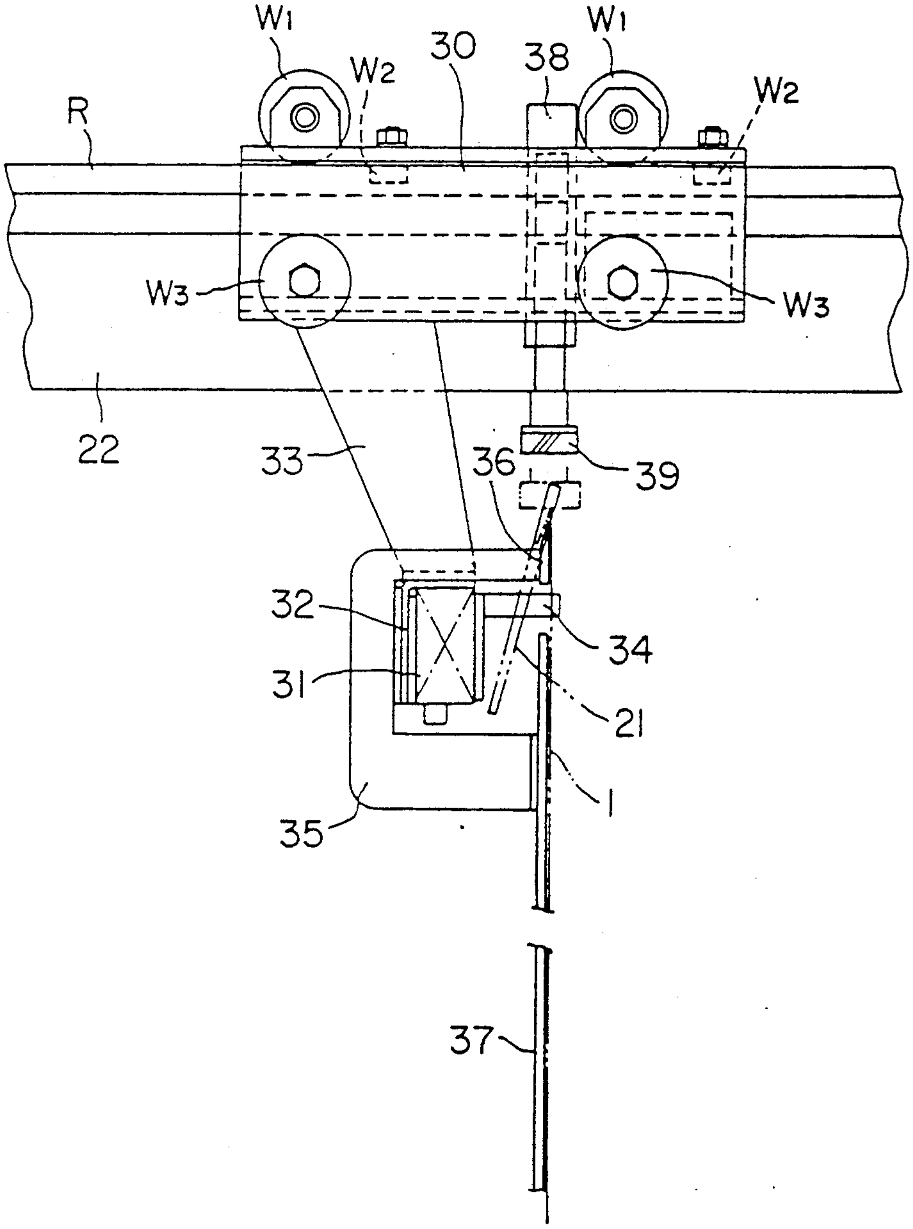

As shown in FIG. 5, a pair of space-apart, inversely C-shaped fixtures 35, 35 are secured to the fixture 32. At the upper, free end thereof, a lithographic plate suspension plate 36 is fixed, so as to suspend a lithographic plate 1 with the upper edge 36' thereof at the level shown in FIG. 4. This level is slightly lower than the level at which the hook 1' is situated when the lithographic plate 1 is suspended by the pair of swivelable engaging members 21, 21. Also, at the lower free end of fixture 35, a plate 37 for preventing vibration of the lithographic plate 1 is provided.

As illustrated in FIG. 4, a plate 39 is attached to the carriage means 30 so as to urge the hook portion 1' of the lithographic plate 1 toward the upper edge 36' of the suspension plate 36 by means of a cylinder 38. As the pair of swivelable engaging members 21, 21 are turned to the position shown by two-dot-dash line in FIG. 4, the lithographic plate 1 drops therefrom; and the hook 1' thereof is received by the upper edge 36' of the suspension plate 36; and then, the plate 39 is lowered to the position as shown by two-dot-dash line in FIG. 4 so as to positively hold the hook 1' against the upper edge 36' of the suspension plate 36.

As schematically shown in FIG. 1, a lithographic plate storage shelf 40 is provided at one of the lower sides of the carriage means 30. The shelf 40 comprises a number of perpendicularly spaced-apart partitions 41, 41 . . . ; and a pair of photosensors 42 are provided to each of the opposing surfaces of the partitions 41 at the different levels.

The opening of the shelf 40 faces toward the running path of the carriage means 30.

As a lithographic plate 1 is fed into a space defined by a pair of adjacent partitions 41, 41, a photo sensor 42 is operated so that a lamp is lit on the panel 43 for indicating the given number of the particular space defined by said pair of partitions; and at the same time, the type of said lithographic plate as registered when the plate 1 was put to the hanger conveyor H is also indicated.

Figure 6:
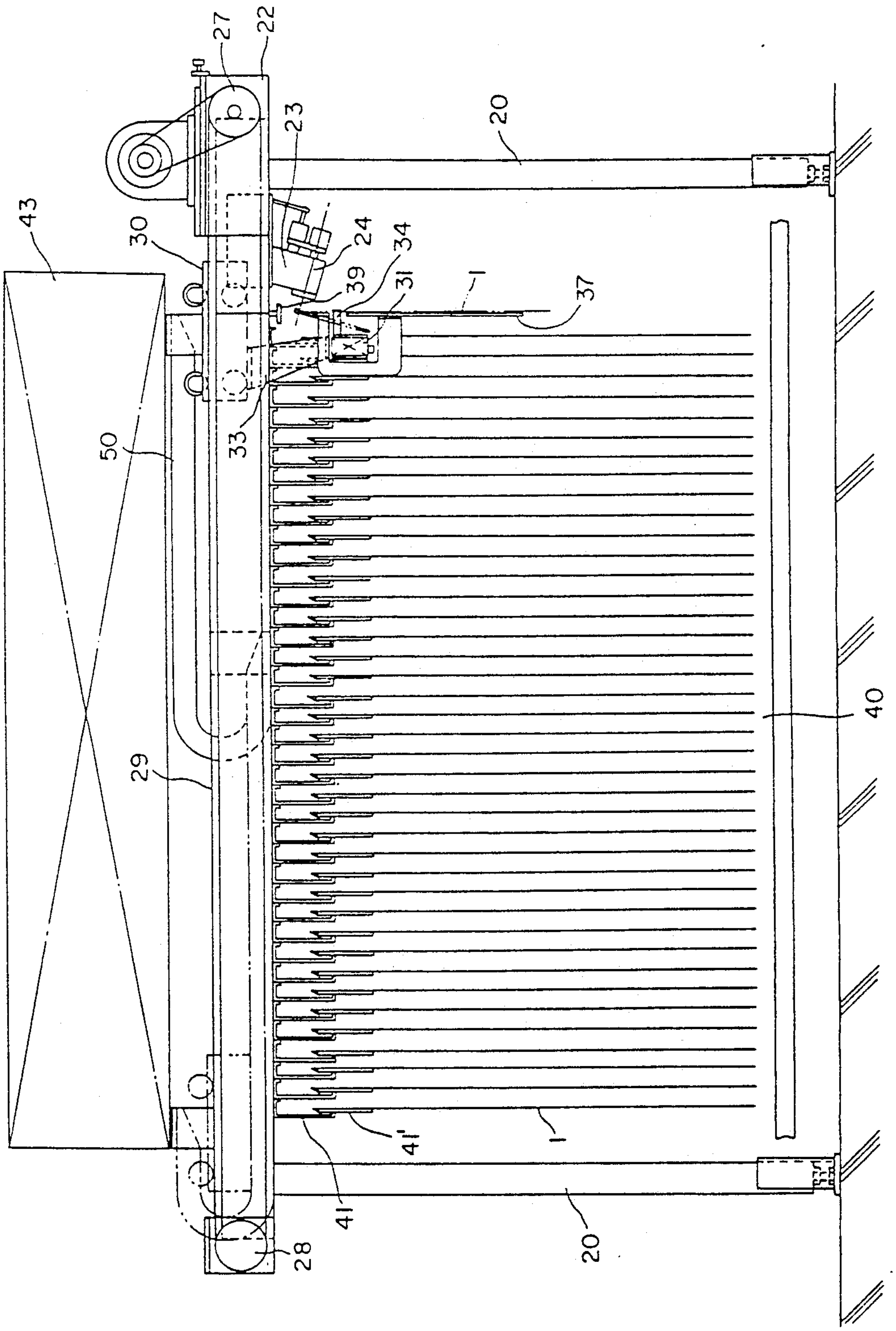
Figure 7:
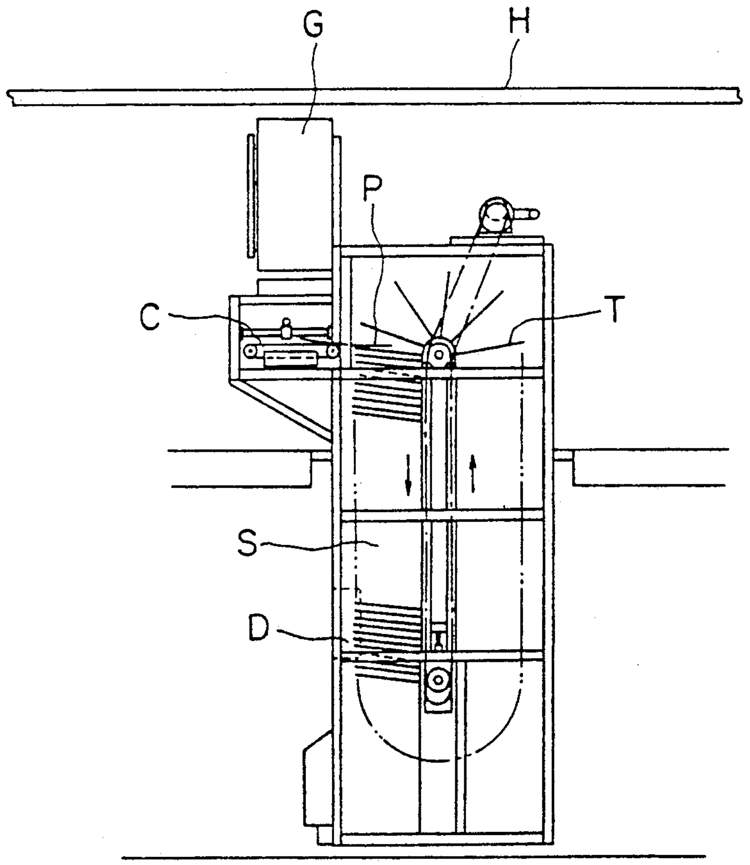
FIG. 7 PRIOR ART
FIG. 7 is a schematic front view of prior art.

Thus, as will be understood from FIG. 6, the carriage means 30 first approaches (from left to right in FIG. 6) the pair of the swivelable engaging members 21, 21 which are holding a lithographic plate 1 as mentioned before; and receives the lithographic plate 1 therefrom as explained hereinabove with reference to FIG. 4 by means of the suspension plate 36. Thereafter, the carriage means 30 runs along the front opening of the shelf 40 and stops in front of an empty space between a pair of partitions 41, 41. Then, the rod-less cylinder 31 is operated so as to actuate the pusher 34 in the leftward direction in FIG. 4. The righthand edge of the lithographic plate 1 is thus pushed such that the lithographic plate 1 is inserted into the space as the desired location. When this insertion takes place, the hook 1' is caused to slide on the upper edge 36' of the suspension plate 36. In this manner, one cycle of storing a lithographic plate 1 is completed; and by repeating the same procedure, a number of lithographic plates may be stored in a perpendicularly spaced-apart relationship.

Each partition 41 includes a suspension fitting 41' which is at substantially the same level with the edge 36' of the suspension plate 36, so that a lithographic plate 1 inserted into a space between adjacent partitions 41, 41 may be suspended vertically by means of said suspension fitting 41'.

A free end of a flexible supporting sheath 50 is connected to the carriage means 30 so as to supply power to the carriage means 30.

According to the above-mentioned embodiments, horizontally conveyed lithographic plates may be picked up so as to change into a vertically suspended position. And while maintaining the vertically suspended position, they are conveyed by the carriage means and are serially inserted into the spaces defined by adjacent, perpendicularly spaced-apart partitions. Thus, the principle of the prior art, namely, first-in, first-out is no longer applicable; and any desired lithographic plate may be selectively picked out regardless of the order of storage so as to be sent to the position of a rotary presses. Thus, it is now obvious that a remarkable advantage is obtainable by the present invention.

What is claimed is:

1. A lithographic plate storing system comprising: an upwardly and downwardly movable lifting member comprising engaging means for engaging with a downwardly facing hook provided at an upper edge of a vertically disposed lithographic plate; conveyor means for receiving the lithographic plate from said lifting member and depositing said plate in a fixed storage shelf, said conveyor means including:

a movable carriage, and a suspension plate on said carriage, said suspension plate having an upper edge for engaging and supporting said downwardly facing hook, a pair of lithographic plate engagement members swivelable from a first position in which they engage the downwardly facing hook of the lithographic storage plate, and a second position in which they disengage said hook and deposit the plate with its hook in engagement with said upper edge of the suspension plate on said movable carriage, said swivelable plate engagement members being also movable from an advanced position in which they receive said lithographic plate while said lifting member is lowered to a retreated position in which they allow clearance for said lifting member as the lifting member is raised so that the lifting member can be raised without reengaging said downwardly facing hook; and pusher means for sidewardly pushing said lithographic plate along said upper edge of the suspension plate onto a suspension fitting in a fixed storage shelf; and said fixed storage shelf comprising a plurality of perpendicularly spaced-apart partitions and a plurality of suspension fittings for suspending lithographic plates vertically.

2. The lithographic plate storing system according to claim 1 further comprising lithographic plate sensors provided on said plurality of partitions and an indication panel for indicating which of said suspension fittings have lithographic plates supported on them.

3. A lithographic plate storing system comprising: an upwardly and downwardly movable lifting member comprising engaging means for engaging with a downwardly facing hook provided at an upper edge of a vertically disposed lithographic plate; conveyor means for receiving the lithographic plate from said lifting member and depositing said plate in a fixed storage shelf, said conveyor means including:

a movable carriage, and a suspension plate on said carriage, said suspension plate having an upper edge for engaging and supporting said downwardly facing hook, a pair of lithographic plate engagement members swivelable from a first position in which they engage the downwardly facing hook of the lithographic storage plate, and a second position in which they disengage said hook and deposit the plate with its hook in engagement with said upper edge of the suspension plate on said movable carriage, said swivelable plate engagement members being also movable from an advanced position in which they receive said lithographic plate while said lifting member is lowered to a retreated position in which they allow clearance for said lifting member as the lifting member is raised so that the lifting member can be raised without reengaging said downwardly facing hook; and means for sidewardly moving said lithographic plate along said upper edge of the suspension plate onto a suspension fitting in a fixed storage location; and said fixed storage location comprising means providing a plurality of suspension fittings for suspending lithographic plates vertically in parallel planes.

4. A lithographic plate storing system comprising: an upwardly and downwardly movable lifting member comprising engaging means for engaging with a downwardly facing hook provided at an upper edge of a vertically disposed lithographic plate and means for rotating said lifting member about a vertical axis whereby a lithographic plate carried in a vertical condition by said lifting member can be rotated 90 degrees about a vertical axis; conveyor means for receiving the lithographic plate from said lifting member and depositing said plate in a fixed storage shelf, said conveyor means including:

a movable carriage, and a suspension plate on said carriage, said suspension plate having an upper edge for engaging and supporting said downwardly facing hook, a pair of lithographic plate engagement members swivelable from a first position in which they engage the downwardly facing hook of the lithographic storage plate, and a second position in which they disengage said hook and deposit the plate with its hook in engagement with said upper edge of the suspension plate on said movable carriage, said swivelable plate engagement members being also movable from an advanced position in which they receive said lithographic plate while said lifting member is lowered to a retreated position in which they allow clearance for said lifting member as the lifting member is raised so that the lifting member can be raised without reengaging said downwardly facing hook; and means for sidewardly moving said lithographic plate along said upper edge of the suspension plate onto a suspension fitting in a fixed storage location; and said fixed storage location comprising means providing a plurality of suspension fittings for suspending lithographic plates vertically in parallel planes.

* * * * *